US007225335B2

(12) United States Patent
Sato

(10) Patent No.: US 7,225,335 B2
(45) Date of Patent: May 29, 2007

(54) ENCRYPTION APPARATUS

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 706 days.

(21) Appl. No.: 10/618,734

(22) Filed: Jul. 15, 2003

(65) Prior Publication Data

US 2004/0019793 A1 Jan. 29, 2004

(30) Foreign Application Priority Data

Jul. 23, 2002 (JP) ............................... 2002-214281

(51) Int. Cl.
*G06F 1/24* (2006.01)

(52) U.S. Cl. ...................... 713/164; 713/166; 713/168; 713/182

(58) Field of Classification Search ................ 713/164, 713/166, 168, 182
See application file for complete search history.

(56) References Cited

U.S. PATENT DOCUMENTS

| 4,399,323 A | * | 8/1983 | Henry | .......................... 380/30 |
| 5,008,818 A | * | 4/1991 | Bocast | .......................... 714/2 |
| 5,463,690 A | * | 10/1995 | Crandall | ....................... 380/30 |

* cited by examiner

*Primary Examiner*—Thomas R. Peeso
(74) *Attorney, Agent, or Firm*—Oblon, Spivak, McClelland, Maier & Neustadt, P.C.

(57) ABSTRACT

An encryption apparatus performs high-speed and secure signature creation and verification. In the encryption apparatus, at least a shift register group composed of shift registers for retaining values for arithmetic operations for generating a hash value for use in public-key-cryptosystem encryption processing, and shift registers for capturing a resultant hash value, and a shift register group composed of shift registers for retaining values for arithmetic operations for performing public-key-cryptosystem encryption processing and shift registers for capturing an arithmetic result are used for each other. Hardware components to be operated are changed in a time-sharing manner in accordance with a processing mode.

11 Claims, 12 Drawing Sheets

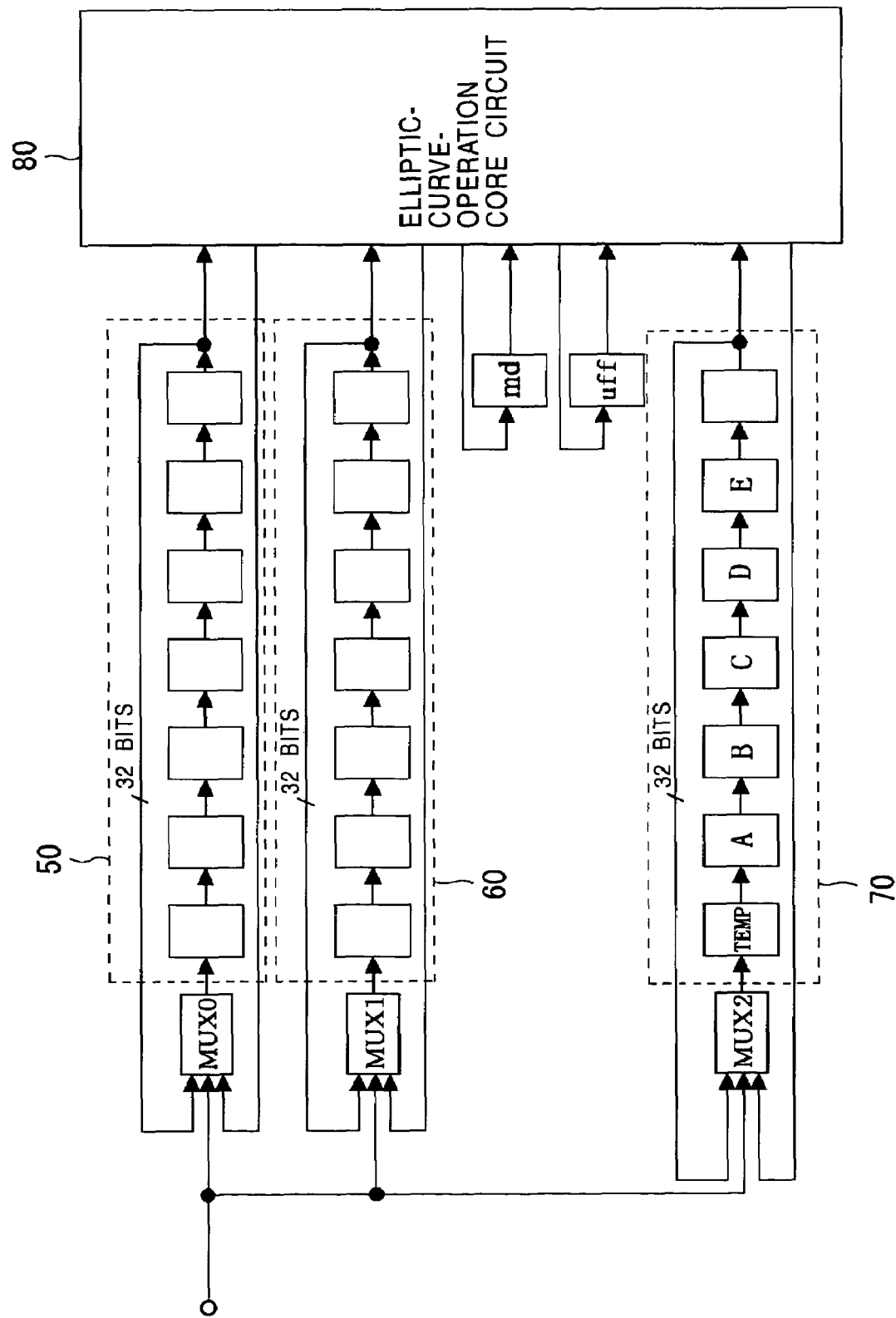

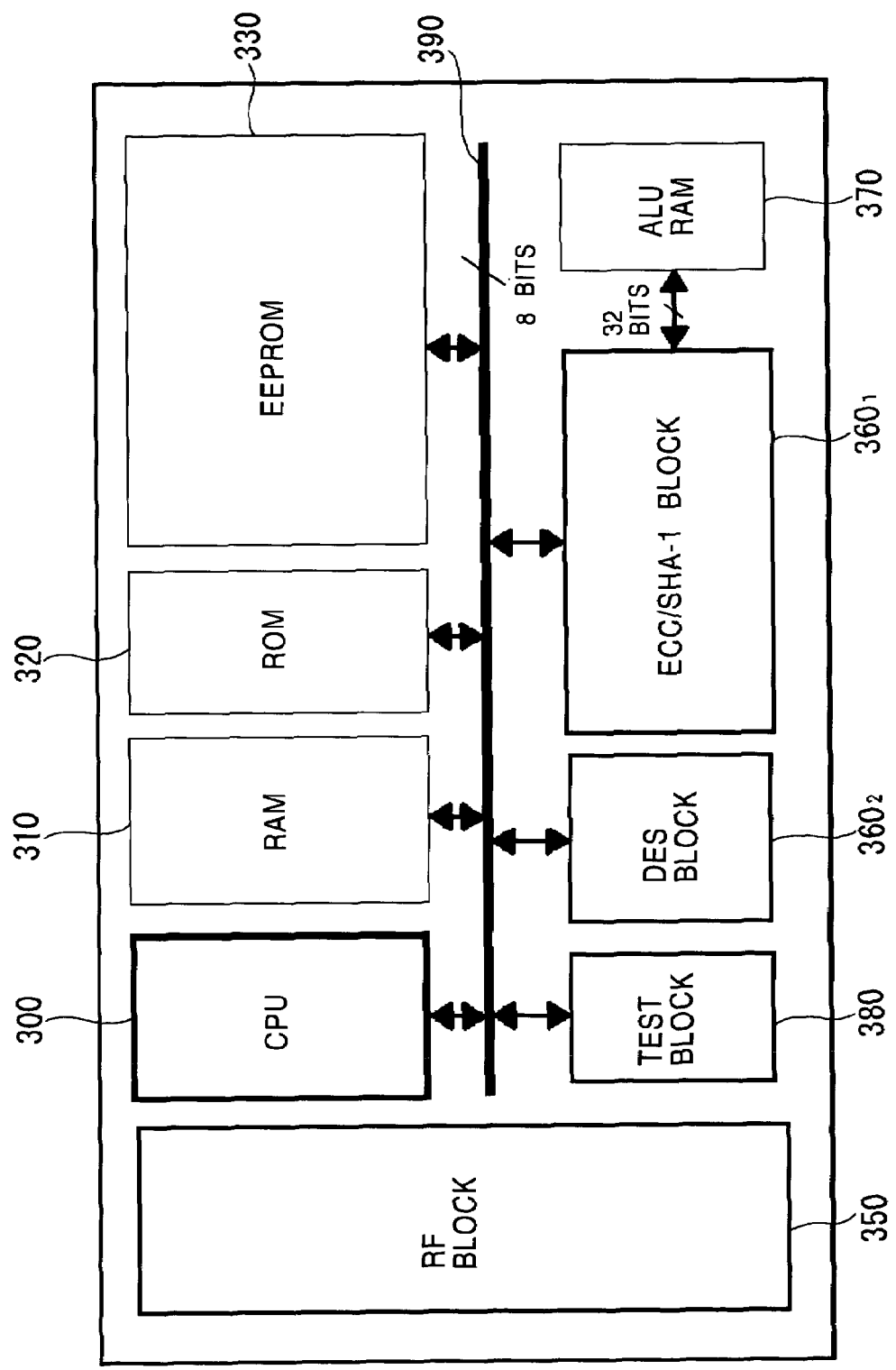

ENCRYPTION APPARATUS

BACKGROUND OF THE INVENTION

1. Field of the Invention

The present invention relates to an encryption apparatus that performs encryption processing using a so-called "public key cryptosystem".

2. Description of the Related Art

In recent years, various services using various communication technologies, such as electronic commerce and online shopping using the Internet or the like, have come into widespread use. Also, in recent years, with the progress in communication technologies, a communication technology using terminals and card-type devices, such as noncontact semiconductor memory cards having integrated-circuit communication functions, has been developed for use in collection of fares in public transportation and electronic money.

From the viewpoint of convenience in handling, etc., the card-type devices (hereinafter referred to as the "noncontact integrated circuit (IC) cards") having communication functions must have small dimensions and must operate by consuming a very small amount of power.

In a service using a noncontact IC card of the above type, mutual authentication processing for authenticating the validity of another communicating party, and encryption processing for ensuring the security of data communication are ordinarily performed. For this purpose, the processing speed of the noncontact IC card must be increased. When the above functions are implemented by software, a high-frequency-clock central processing unit (CPU) is required, which is not practical. Accordingly, it is preferable not to use software, but instead to use hardware to implement the above functions.

Among noncontact IC cards provided with the above functions in hardware, many employ a so-called "common key cryptosystem", for example, a Data Encryption Standard (DES) cryptosystem that can be implemented by circuits of relatively small dimensions and power consumption in order to suppress power consumption as much as possible.

The common key cryptosystem, which uses a common key for encryption and decryption, is vulnerable to an unauthorized third party since key data must be sent and received. Therefore, there is concern about this problem in cases such as the application of noncontact IC cards to financial services in the future.

Accordingly, in services using noncontact IC cards, a high security system employing a so-called "public key cryptosystem" has become required noncontact IC cards. In the public key cryptosystem, different keys are used for encryption and decryption, and one particular person only needs to retain a common key that must be kept secret, as in a Rivest-Shamir-Adleman (RSA) cryptosystem and the elliptic curve cryptosystem (ECC). Also, many attempts have been made to develop noncontact IC cards using a public key to perform signature creation and signature verification.

Although the public key cryptosystem has much higher security than that of the common key cryptosystem, the required number of operations is huge. The use of hardware to implement the public key cryptosystem multiplies the required circuit size by an order of magnitude, and power supplied to the enlarged circuit inevitably increases.

Therefore, noncontact IC cards employing the public key cryptosystem cannot exhibit sufficient characteristics in terms of circuit size, power consumption, and cost. In particular, since each noncontact IC card must supply most of the limited power to the circuit for encryption processing, only a type of noncontact IC card having a short communication distance (several millimeters) has actually been put to practical use.

As described above, noncontact IC cards should employ the public key cryptosystem, which provides strong security. However, it is very difficult to implement the public key cryptosystem due to restrictions concerning power to be supplied, chip size, etc.

SUMMARY OF THE INVENTION

The present invention is made in view of the above circumstances, and it is an object of the present invention to provide an encryption apparatus that performs high-speed and secure signature creation and verification using a public key in a structure having reduced circuit size and consuming very small power.

According to an aspect of the present invention, an encryption apparatus for performing public-key-cryptosystem encryption processing is provided. The encryption apparatus includes a public-key-cryptosystem processing unit which includes a register group composed of registers for retaining values for use in arithmetic operations and registers for capturing the results of the arithmetic operations, and which performs public-key-cryptosystem encryption processing, and a hash value generating unit for generating a hash value for use in the public-key-cryptosystem processing unit. The register group is also used as at least a register group composed of registers for retaining values for arithmetic operations in the hash value generating unit and registers for capturing a resultant hash value, and hardware components are changed in a time-sharing manner in accordance with a processing mode.

Preferably, the encryption apparatus further includes a common-key-cryptosystem encryption processing unit for generating random numbers which are necessary when the public-key-cryptosystem processing unit performs encryption processing. The register group in the public-key-cryptosystem processing unit is also used as a register group in the common-key-cryptosystem processing unit which is composed of registers for retaining data and registers for retaining key data.

The common-key-cryptosystem encryption processing unit may perform Data Encryption Standard encryption processing.

The public-key-cryptosystem processing unit may include a public-key-cryptosystem-operation core unit for performing various types of arithmetic operations in the public-key-cryptosystem encryption processing, the hash value generating unit may include a hash-value-operation core unit for various types of arithmetic operations in the hash value generation, and the public-key-cryptosystem-operation core unit and the hash-value-operation core unit may share the same hardware components.

The public-key-cryptosystem-operation core unit may include an adding unit, the hash-value-operation core unit may include an adding unit, and the adding unit of the public-key-cryptosystem-operation core unit and the adding unit of the hash-value-operation core unit may share the same hardware components.

The public-key-cryptosystem-operation core unit may include a bus-changeover switch for changing bit width, and the hash value generating unit may include a bus-changeover switch for changing bit width which is also used as the bus-changeover switch of the public-key-cryptosystem processing unit.

The encryption apparatus may further include a common-key-cryptosystem processing unit which performs common-key-cryptosystem encryption processing for generating random numbers which are necessary for the encryption processing by the public-key-cryptosystem processing unit. The common-key-cryptosystem processing unit may include a bus-changeover switch which is also used as the bus-changeover switch of the public-key-cryptosystem processing unit.

The encryption apparatus may further includes a storage unit for storing the hash value generated by the hash value generating unit. The hash value generating unit may store the generated hash value at an address used by the public-key-cryptosystem processing unit when storing the generated hash value in the storage unit, and the public-key-cryptosystem processing unit may read the stored hash value from the storage unit.

The public-key-cryptosystem processing unit may perform Elliptic Curve Cryptosystem processing.

The hash value generating unit may perform Secure Hash Algorithm 1 processing.

According to another aspect of the present invention, a noncontact integrated circuit card having a communication function is provided. The noncontact integrated circuit card includes the encryption apparatus which is built into the noncontact integrated circuit card.

According to an encryption apparatus of the present invention, registers for use are shared in a time-sharing manner by encryption processing by a public-key-cryptosystem processing unit and hash value generating processing by a hash value generating unit. This enables secure signature creation and verification using a public key in circumstances with reduced circuit size and very small power consumption.

According to the present invention, when an encryption apparatus includes a common-key encryption processing unit, registers for use are shared in a time-sharing manner, not only by encryption processing by a public-key-cryptosystem processing unit and hash value generating processing by a hash value generating unit, but also by encryption processing by the common-key encryption processing unit, whereby circuit size and power consumption can be greatly reduced.

According to an encryption apparatus of the present invention, an arithmetic operation core unit for use in arithmetic operations are shared in a time-sharing manner by encryption processing by a public-key-cryptosystem processing unit and hash value generating processing by a hash value generating unit, and bus-changeover switches are shared in a time-sharing manner by both units, whereby circuit size and power consumption can be greatly reduced.

According to the present invention, when an encryption apparatus includes a common-key encryption processing unit, bus-changeover switches are shared in a time-sharing manner, not only by encryption processing by a public-key-cryptosystem processing unit and hash value generating processing by a hash value generating unit, but also by encryption processing by the common-key encryption processing unit. This enables greatly reduced circuit size and power consumption.

According to an encryption apparatus of the present invention, a hash value generated by a hash value generating unit is transferred by using a storage unit without transferring data in order that the hash value is used in the next encryption processing by a public-key encryption processing unit, whereby, not only reduced circuit size and power consumption, but also high speed processing can be achieved.

BRIEF DESCRIPTION OF THE DRAWINGS

FIGS. 1A, 1B, and 1C are illustrations of the concept of an encryption apparatus, in which FIG. 1A shows a functionally analyzed form of hardware components in an encryption engine that performs an Elliptic Curve Cryptosystem process, FIG. 1B shows a functionally analyzed form of hardware components in an encryption engine that performs an SHA-1 process, and FIG. 1C shows a form sharing a register group as a hardware component for performing each of the Elliptic Curve Cryptosystem process and the SHA-1 process;

FIG. 6 is a block diagram illustrating a configuration as a specific example in which an Elliptic Curve Cryptosystem processing circuit is implemented;

FIGS. 7A and 7B are block diagrams illustrating main components of the Elliptic Curve Cryptosystem processing circuit, in which FIG. 7A shows the case of changing bit width by changing the number of shift registers from the right in a shift register group, and FIG. 7B shows the case of changing bit width by changing the number of shift registers from the left in a shift register group;

FIG. 11 is a block diagram showing functional representations of components of the noncontact IC card; and FIGS. 12A, 12B, 12C, and 12D are block diagrams illustrating a time-divisional operation of the noncontact IC card, in which FIG. 12A illustrates an operation in a communication mode, FIG. 12B illustrates an operation in an Elliptic Curve Cryptosystem processing mode, FIG. 12C illustrates an operation in a DES encryption processing mode, and FIG. 12D shows an operation in an ALU RAM mode.

DESCRIPTION OF THE PREFERRED EMBODIMENTS

Embodiments of the present invention are described below with reference to the accompanying drawings.

In the embodiments, an encryption apparatus can be applied to, for example, card-type devices (hereinafter referred to as "noncontact integrated circuits (ICs)") such as noncontact semiconductor memory devices having communication functions in the form of an integrated circuit. In the encryption apparatus, the functions of mutual authentication processing for authenticating the validity of another communicating party, and encryption processing for ensuring the security of data communication are implemented by hardware. In particular, the encryption apparatus employs a so-called "public key cryptosystem". In the encryption apparatus, each hardware component for performing various processes is shared by the processes and the processes are executed in a time-sharing manner, whereby high-speed and secure signature creation and verification can be performed by very small power consumption, with the circuit size reduced.

In the following, for convenience of description, in the encryption apparatus, the "Elliptic Curve Cryptosystem (ECC)" is used as the public key cryptosystem, the "Secure Hash Algorithm 1 (SHA-1)" is used as a hash function for use in authentication, digital signatures, etc., and one of common key cryptosystems, that is, a so-called "Data Encryption Standard (DES)" cryptosystem, is used to generate random numbers which are required for encryption processing and which are used in a key generating process, etc. In other words, in the description, it is assumed that the encryption apparatus performs, as consecutive signal processing of the public key cryptosystem, at least the processes of the Elliptic Curve Cryptosystem, the SHA-1, and the DES cryptosystem.

At first, the concept of sharing each hardware component for performing the Elliptic Curve Cryptosystem process, the SHA-1 process, and the DES encryption process is described.

Figure 1A:
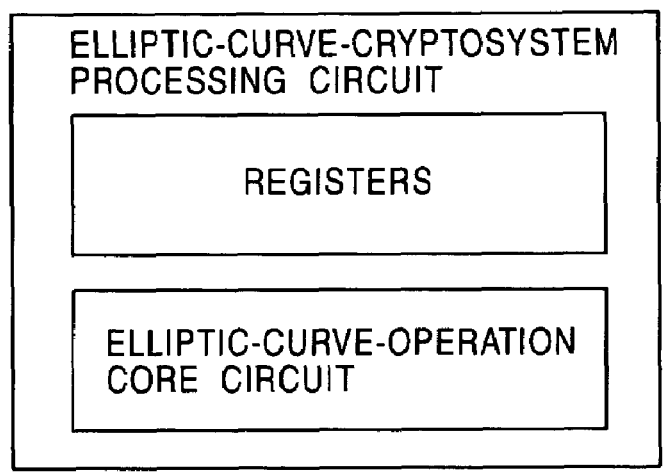
Figure 1B:
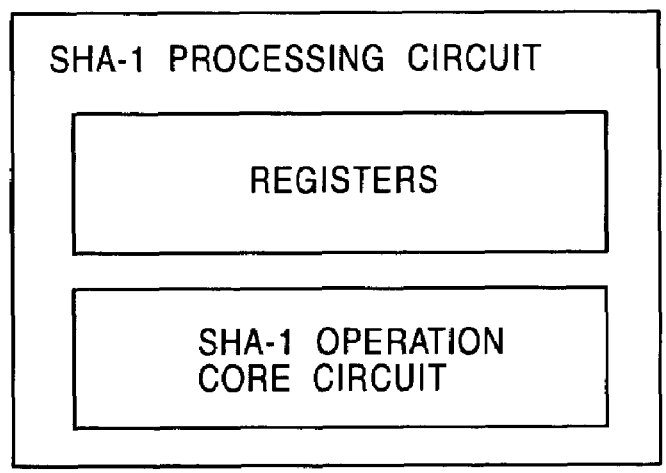
Figure 1C:
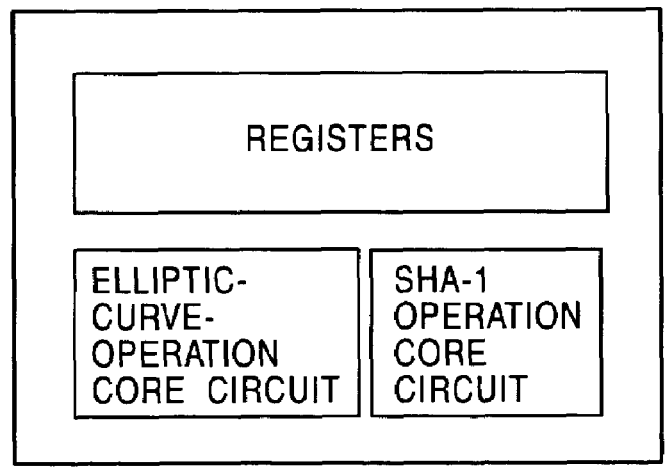

At first, the encryption apparatus shares registers which are hardware components for performing the Elliptic Curve Cryptosystem process, the SHA-1, and the DES encryption process. Specifically, as FIG. 1A shows, hardware components in an encryption engine for performing the Elliptic Curve Cryptosystem process are broadly divided by a functional analysis into registers and an Elliptic Curve operation core circuit. As FIG. 1B shows, hardware components in an encryption engine for performing the SHA-1 process are broadly divided by a functional analysis into registers and an SHA-1 operation core circuit. Accordingly, in the encryption apparatus, as FIG. 1C shows, registers used as hardware components for performing the Elliptic Curve Cryptosystem process and the SHA-1 process are shared. Also, hardware components in an encryption engine for performing the DES encryption process are broadly divided by a functional analysis into registers and an operation core circuit, which are not shown. Thus, the encryption apparatus shares registers used as hardware components for performing the DES encryption process in addition to the Elliptic Curve Cryptosystem encryption process and the SHA-1 process. This can achieve a reduction in the circuit size of the encryption apparatus.

The encryption apparatus also shares the operation core circuit for performing the SHA-1 process and the operation core circuit for performing the Elliptic Curve Cryptosystem process. Specifically, the SHA-1 process which calculates a hash value requires an operation core circuit including a high-speed functioning adder. The operation circuit for the Elliptic Curve Cryptosystem process also includes an adder. Accordingly, the encryption apparatus shares hardware components having a large number of gates such as adders in the operation core circuits for the SHA-1 process and the Elliptic Curve Cryptosystem process. This can achieve a reduction in the circuit size of the encryption apparatus.

In the encryption apparatus, bus-changeover switches and other function changeover switches in the encryption engine are shared. Specifically, since buses must be changed in order to enable a variable key length in the public key cryptosystem, the encryption engine for performing the Elliptic Curve Cryptosystem process includes many switches having, for example, 32-bit width. These switches can be shared by the hardware for performing the SHA-1 process and the DES encryption process. Accordingly, in the encryption apparatus, the above bus-changeover switches can be used as the other function changeover switches. This enables the reduced circuit size of the encryption apparatus.

In the encryption apparatus, hardware such as registers and memories are shared in a time-sharing manner. The signal processing in the public key cryptosystem in the encryption apparatus is broadly divided into the generation of random numbers by using the DES encryption process, calculation of hash values by the SHA-1 process, and calculation of an elliptic curve in the Elliptic Curve Cryptosystem process. Since the above processes cannot be simultaneously performed, time-divisional processing must be inevitably performed when the hardware is shared. Accordingly, in the encryption apparatus, components of the hardware such as the registers and memories are shared in a time-sharing manner by each process. This enables the encryption apparatus to achieve a reduction in circuit size and a reduction in power consumption.

As described above, in the encryption apparatus, the hardware for performing the Elliptic Curve Cryptosystem process, the SHA-1 process, and the DES encryption process are shared, and time-divisional processing is performed.

In the encryption apparatus, in the case of implementing the Elliptic Curve Cryptosystem process, the SHA-1 process, and the DES encryption process, in order to share each hardware component for performing the Elliptic Curve Cryptosystem process, the SHA-1 process, and the DES encryption process, it is required that the configuration of the hardware be easily shared. In the following, after describing examples of implementation in which each hardware component for performing the Elliptic Curve Cryptosystem process, the SHA-1 process, and the DES encryption process is easily shared, a specific example of the encryption apparatus in which the hardware components are integrated is described.

At first, an SHA-1 processing circuit used as hardware for performing the SHA-1 process is described below.

The SHA-1 processing circuit performs the SHA-1 process. The SHA-1 is one of hash functions for use in authentication, digital signatures, etc. It is a unidirectional, irreversible function for generating, from arbitrary 512-bit original, a hash value that is a 160-bit pseudo random number. In the SHA-1, when the original has even one-bit difference, a completely different hash value is output. Thus, the SHA-1 is widely used for the purpose of checking the original for falsification on a communication path by generating hash values and comparing the hash values of two ends of the communication path. Specifically, in the SHA-1 process using the SHA-1, in the case of transmitting a message, a transmitter simultaneously transmits the message and a hash value for the message, and a receiver checks the data of the message for falsification by calculating a hash value from the received message, and comparing the calculated hash value with the transmitted hash value. The SHA-1 processing circuit is designed to perform the above-described SHA-1 process. Here, in the SHA-1 defined in the Federal Information Processing Standard (FIPS), the Alternative Method that only needs relatively small circuit size is employed.

The algorithm of the Alternative Method is an alterative which uses small memory space to realize the SHA-1 process which is normally performed by using eighty 32-bit word sequences W(0), . . . , W(79). In this algorithm, {W(t)} is regarded as a recurring queue, and sixteen 32-bit word sequences W(0), . . . , W(15) are used. In this algorithm, for each 512-bit-length block M(i), the following four steps are performed. The value MASK in the following is hexadecimal "0000000F".

In this algorithm, in the first step, block M(i) is divided into sixteen words W(0), . . . , W(15). Word W(0) is the leftist word.

Next, in this algorithm, when first five word buffers are represented by A, B, C, D, and E, and second five word buffers are represented by H0, H1, H2, H3, and H4, in the second step, the operations represented by the following expression (1) are performed.

$$\begin{cases} A = H0; \\ B = H1; \\ C = H2; \\ D = H3; \\ E = H4; \end{cases} \quad (1)$$

Next, in this algorithm, in the third step, the operations represented by the following expression (2) are performed, with variable t changed from "0" to "79".

$$\begin{cases} s = t \text{ AND MASK}; \\ \text{if}(t \geq 16) \\ W[s] = S1(W[(s+13) \text{AND MASK}] XOR \ W[(s+8) \text{AND MASK}] \\ XOR \ W[(s+2) \text{AND MASK}] XOR \ W[s]); \\ \text{TEMP} = S5(A) + F(t; B, C, D) + E + W[s] + Kt; \\ E = D; \\ D = C; \\ C = S30(B); \\ B = A; \\ A = \text{TEMP}; \end{cases} \quad (2)$$

In the expression (2), Sn(X) represents a recurring left shifting operation where n represents an integer of 0≦n<32. Also, in the expression (2), F(t; B, C, D) is the function represented by the following expression (3), and K(t) is the hexadecimal word constant string represented by the following expression (4):

$$\begin{cases} F(t; B, C, D) = (B \text{ AND } C) OR((\text{NOT } B) \text{AND } D)(0 \leq t \leq 19) \\ F(t; B, C, D) = B \ XOR \ C \ XOR \ D(20 \leq t \leq 39) \\ F(t; B, C, D) = (B \text{ AND } C) OR(B \text{ AND } D) OR(C \text{ AND } D)(40 \leq t \leq 59) \\ F(t; B, C, D) = B \ XOR \ C \ XOR \ D(60 \leq t \leq 79) \end{cases} \quad (3)$$

$$\begin{cases} K(t) = 5A827999 \ (0 \leq t \leq 19) \\ K(t) = 6ED9EBA1 \ (20 \leq t \leq 39) \\ K(t) = 8F1BBCDC \ (40 \leq t \leq 59) \\ K(t) = CA62C1D6 \ (60 \leq t \leq 79) \end{cases} \quad (4)$$

In this algorithm, in the fourth step, the operations represented by the following expression (5) are performed and the consecutive processing is terminated.

$$\begin{cases} H0 = H0 + A; \\ H1 = H1 + B; \\ H2 = H2 + C; \\ H3 = H3 + D; \\ H4 = H4 + E; \end{cases} \quad (5)$$

Figure 2:
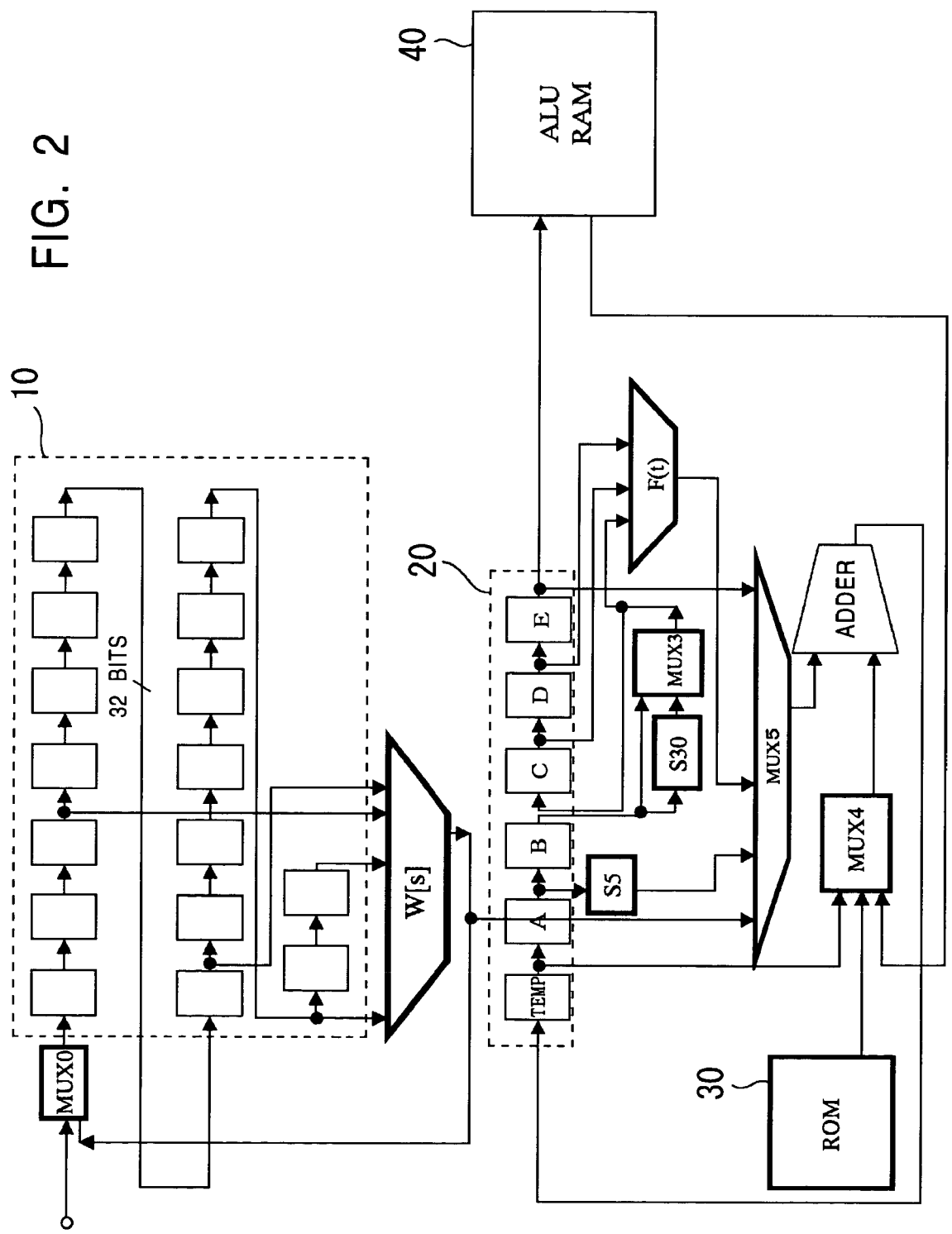
FIG. 2 is a block diagram illustrating a configuration as a specific example in which the a SHA-1 processing circuit is implemented.

Here, when the algorithm of the Alternative Method is implemented in a general form, the SHA-1 processing circuit has a configuration as shown in FIG. 2.

Specifically, as shown in FIG. 2, the SHA-1 processing circuit includes a shift register group 10 for temporarily storing values for arithmetic operations which are supplied from a CPU (not shown), a shift register group 20 which is constituted by five shift registers used as the above-described word buffers A, B, C, D, and E, and a shift register for retaining the above value TEMP, and which is used for capture a resultant hash value, a read-only memory (ROM) 30 for retaining initial values H0, H1, H2, H3, and H4, and the hexadecimal word constant string represented by expression (4), an arithmetic and logical unit/random access memory (ALU RAM) 40 for storing a resultant hash value, and various arithmetic processing circuits for performing various operations in the above algorithm. The SHA-1 processing circuit also includes bus-changeover switches MUX0, MUX3, MUX4, and MUX5.

Figure 3:
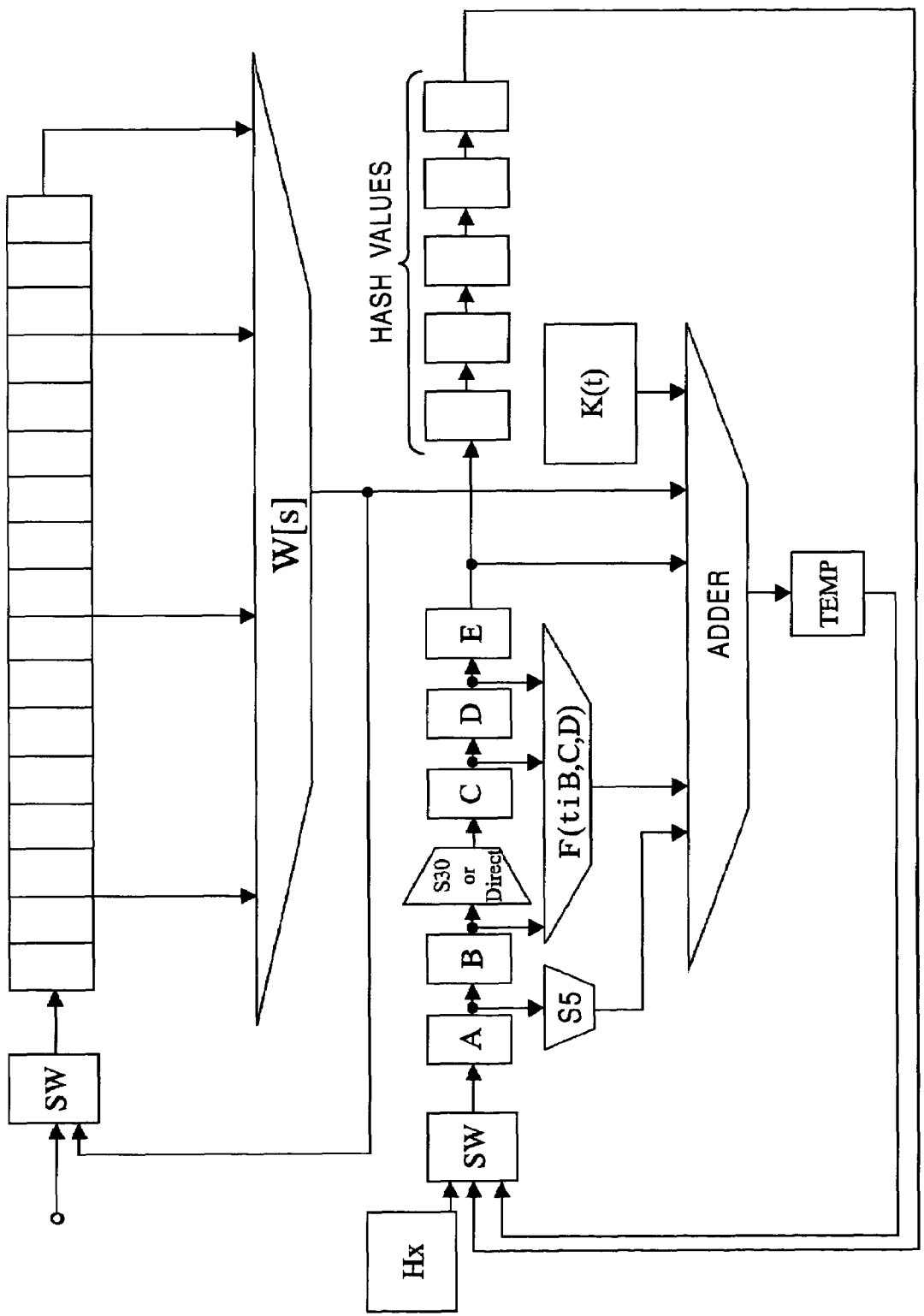
FIG. 3 is a block diagram illustrating another configuration as a specific example in which the a SHA-1 processing circuit is implemented.

When the size of the SHA-1 processing circuit is taken into consideration, the TEMP calculating expression in expression (2), that is, a 32-bit five-input adder for executing the operation represented by the following expression (6), is a main factor causing an increase in circuit size. Accordingly, the SHA-1 processing circuit uses an ignorable smaller time for performing operations of the SHA-1 process than the time required for operations of the Elliptic Curve Cryptosystem process. Specifically, as shown in FIG. 3, the SHA-1 processing circuit has a circuit size reduced by using a 32-bit two-input adder four times.

$$\text{TEMP} = S5(A) + F(t; B, C, D) + E + W[s] + Kt; \quad (6)$$

In this case, the SHA-1 processing circuit has an operating time which is approximately four to five times that in the configuration shown in FIG. 2. However, the operating time is sufficiently shorter than that of the Elliptic Curve Cryptosystem process, causing no problem in practical use. Thus, sufficient performance of the SHA-1 processing circuit can be obtained, excluding cases such as the case of performing the SHA-1 process on huge amounts of data and stream.

In the SHA-1 processing circuit, as described later, by using an adder for use in the Elliptic Curve Cryptosystem process as the adder in the SHA-1 processing circuit, the need for the adder itself in the SHA-1 processing circuit is eliminated, thus greatly reducing circuit size.

In addition, it is understood that, in the SHA-1 processing circuit, when the expression of calculating word W[s] in expression (2), that is, the operation represented by the following expression (7), is executed, sixteen stages of 32-bit shift registers are required.

$$W[s] = S1(W[s+13] \text{ AND MASK}] XOR\ W[s+8] \text{AND MASK}] \quad (7)$$
$$XOR\ W[s+2] \text{AND MASK}] XOR\ W[s]);$$

Also, in the SHA-1 processing circuit, when the expression of calculating the word buffers A, B, C, D, and E in expression (2), that is, the operations represented by the following expression (8) are executed, at least five to six stages of 32-bit shift registers are required.

$$\begin{cases} E = D; \\ D = C; \\ C = S30(B); \\ B = A; \\ A = \text{TEMP}; \end{cases} \quad (8)$$

Here, in the Elliptic Curve Cryptosystem processing circuit used as hardware for performing the Elliptic Curve Cryptosystem process, three sets of seven stages of 32-bit registers in which the number of stages can be changed are provided. Thus, by using these shift registers for the SHA-1 processing circuit, the SHA-1 processing circuit does not need to include dedicated shift registers, so that circuit size can be more greatly reduced. As a result, in the encryption apparatus, the SHA-1 processing circuit, which normally includes 60000 gates or more, can be formed by only adding circuits of 2000 gates to the Elliptic Curve Cryptosystem processing circuit.

Figure 4:
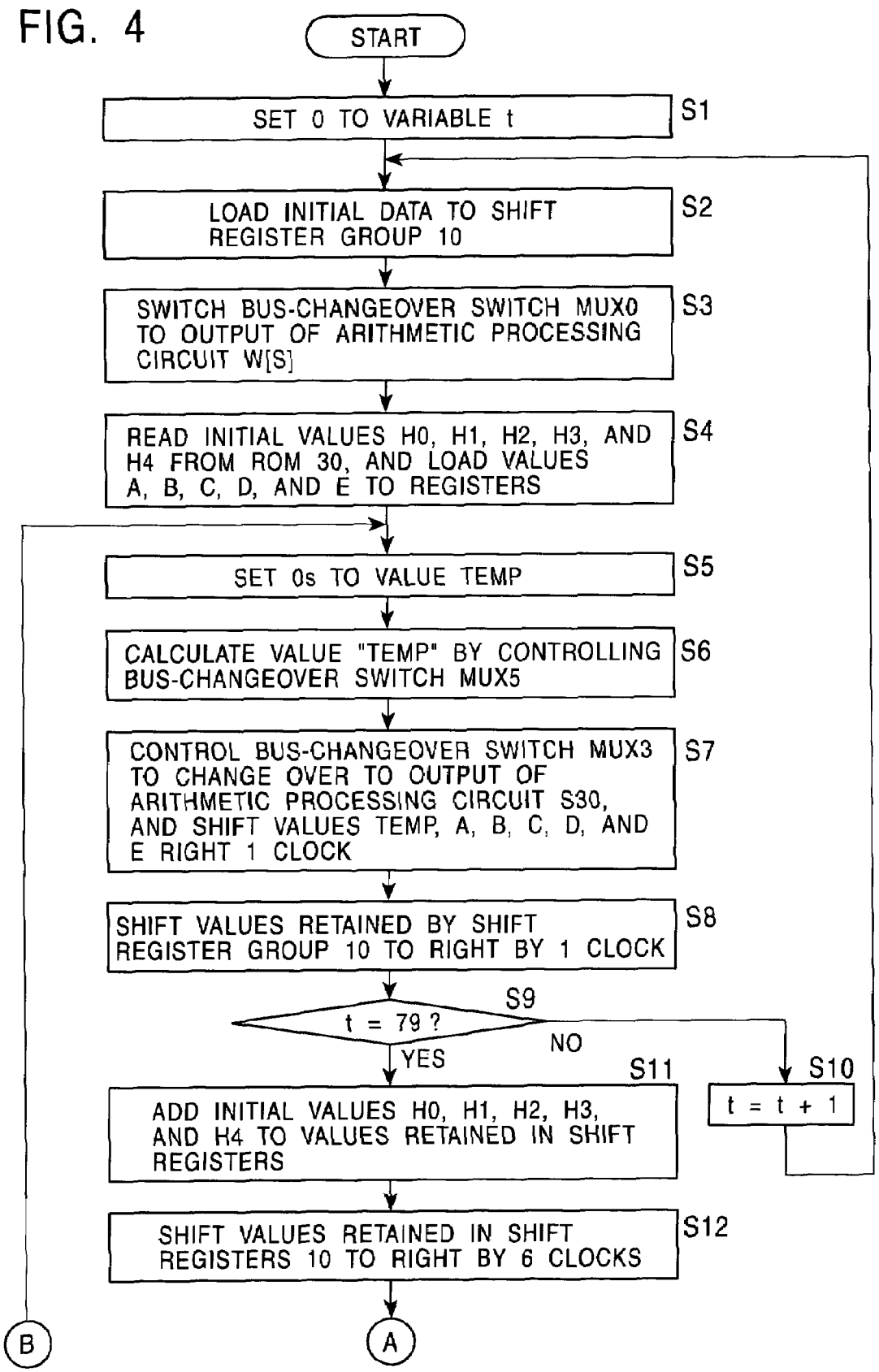
FIG. 4 is a flowchart illustrating a basic operation in the SHA-1 processing circuit shown in FIG. 2.
Figure 5:
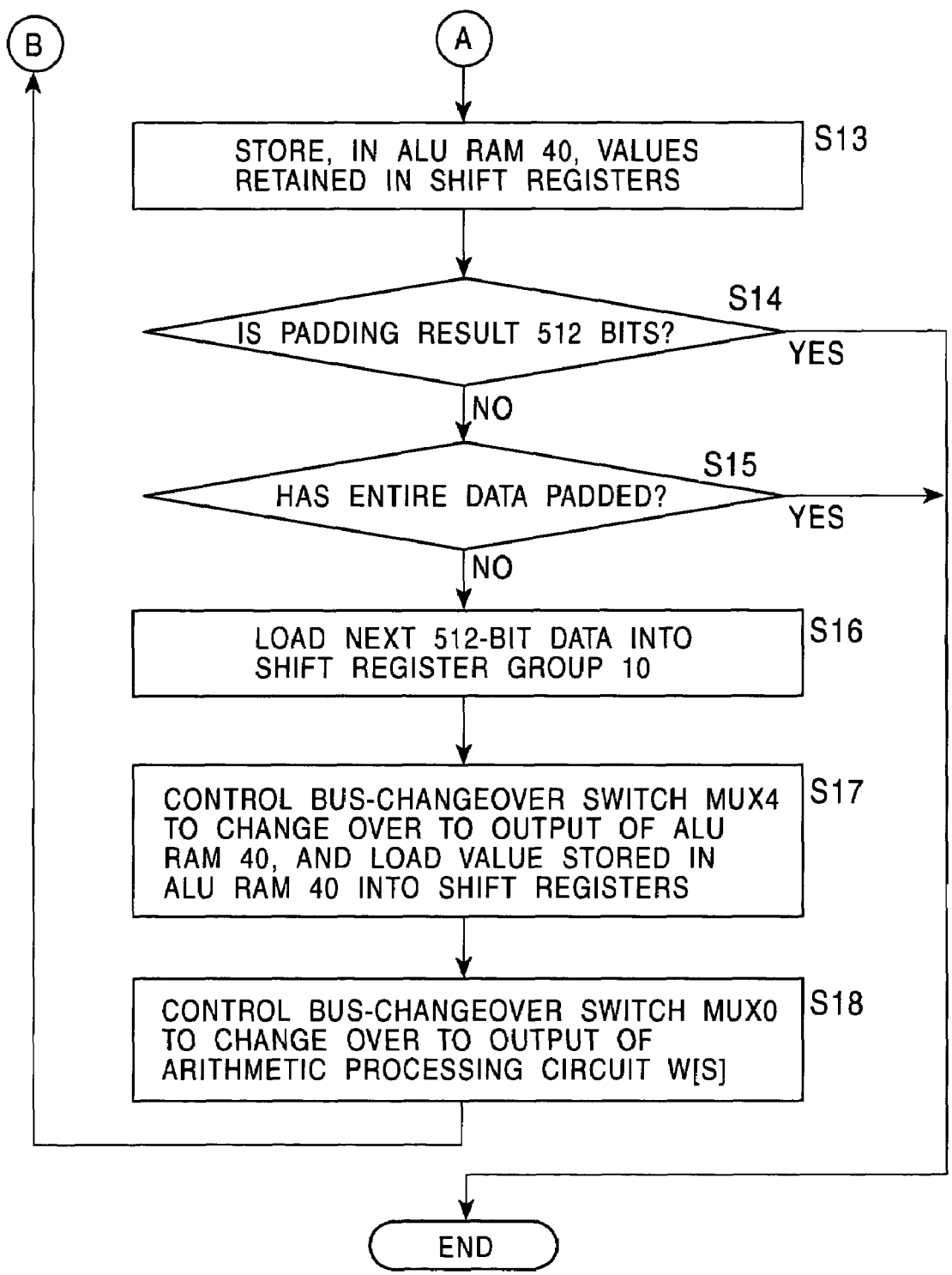
FIG. 5 is a flowchart which illustrates the basic operation in the SHA-1 processing circuit in FIG. 2 and which illustrates the other steps following the steps shown in FIG. 4.

The SHA-1 processing circuit performs a basic operation by executing the consecutive steps shown in FIGS. 4 and 5. Here, the basic operation of the SHA-1 processing circuit having the configuration shown in FIG. 2 is described below.

As shown in FIG. 4, in step S1, the SHA-1 processing circuit sets variable t to "0".

In step S2, in the SHA-1 processing circuit, from padded data, initial data composed of 32 by 16 (=512 bits) blocks is loaded into each shift registers in the shift register group 10.

In step S3, the SHA-1 processing circuit causes the bus-changeover switch MUX0 to change over to the output of an arithmetic processing circuit (represented by W[s]).

In step S4, in the SHA-1 processing circuit, initial values H0, H1, H2, H3, and H4 are read from the ROM 30, and are sequentially loaded into the shift registers used as the word buffers A, B, C, D, and E in the shift register group 20 through the bus-changeover switch MUX4, the adder, and the shift register (in the shift register group 20) which retains the value TEMP.

In step S5, zeroes are set to value TEMP.

In step S6, by controlling the bus-changeover switch MUX5 to perform adding by the adder four separate times, the SHA-1 processing circuit performs operations equivalent to those represented by expression (6) to calculate value TEMP.

$$\begin{cases} S5(A) + F(t) \Rightarrow \text{TEMP}; \\ \text{TEMP} + E \Rightarrow \text{TEMP}; \\ \text{TEMP} + W[s] \Rightarrow \text{TEMP}; \\ \text{TEMP} + K(t) \Rightarrow \text{TEMP}; \end{cases} \quad (9)$$

In step S7, the SHA-1 processing circuit controls the bus-changeover switch MUX3 to change over to the output side of the arithmetic processing circuit 30, and shifts the value TEMP retained in each shift register to the right by one clock. This enables the SHA-1 processing circuit to obtain the values represented in expression (8).

In step S8, in the SHA-1 processing circuit, the values retained in each shift register in the shift register group 10 are shifted right one clock.

In step S9, the SHA-1 processing circuit determines whether or not variable t has reached "79". If the SHA-1 processing circuit has determined that variable t has not reached "79", it proceeds to step S10, and variable t is incremented by 1. Subsequently, steps S2 to S8 are repeatedly performed. In other words, the SHA-1 processing circuit performs steps S2 to S8 while changing variable t from "0" to "79".

Conversely, if the SHA-1 processing circuit has determined that variable t has reached "79", it proceeds to step S11. In the SHA-1 processing circuit, by controlling the bus-changeover switch MUX3 to change over to the side opposite to the output side of the arithmetic processing circuit S30, and using the output of the bus-changeover switch MUX5, as the output of the shift register as the word buffer E, the adder is used to add initial values H0, H1, H2, H3, and H4 to the values retained in the shift registers as the word buffers A, B, C, D, and E.

Since the results of the calculation by the adder in step S11 are supplied to the shift register retaining the value TEMP, in the SHA-1 processing circuit, the value retained in each shift register is shifted right six clocks in order to realize the operations represented by expression (5).

As shown in FIG. 5, in step S13, the SHA-1 processing circuit stores, in the ALU RAM 40, the values retained in the shift registers used as the word buffers A, B, C, D, and E.

In step S14, the SHA-1 processing circuit determines whether or not the result of padding is 512 bits.

If the SHA-1 processing circuit has determined that the result of padding is 512 bits, the values stored in the ALU RAM 40 in step S13 are used as final hash values. Accordingly, the consecutive processing is directly terminated.

If the SHA-1 processing circuit has determined that the result of padding is not 512 bits but exceeds 512 bits, it determines in step S15 whether or not all the padded data has been loaded into the shift registers in the shift register group 10 and the process has ended.

In step S15, if the SHA-1 processing circuit has determined that all the padded data has not been loaded into the shift registers yet in the shift register group 10 and the process has not ended, it proceeds to step S16, and loads the next 512-bit data in the shift register group 10, while maintaining the state in step S13.

In step S17, the SHA-1 processing circuit controls the bus-changeover switch MUX4 to change over to the output side of the ALU RAM 40, and respectively loads the values retained in the ALU RAM 40 into the shift registers as the word buffers A, B, C, D, and E.

In step S18, the SHA-1 processing circuit controls the bus-changeover switch MUX0 to change over to the output side of the arithmetic processing circuit W[s], and repeatedly performs step S5 (in FIG. 4) and thereafter.

If the SHA-1 processing circuit has determined in step S15 that all the padded data has been loaded into the registers in the shift register group 10 and the process has ended, it terminates the consecutive processing since the value stored in the ALU RAM 40 in step S13 are used as final hash values.

The SHA-1 processing circuit generates hash values by performing the consecutive processing.

Next, the Elliptic Curve Cryptosystem processing circuit as hardware for performing the Elliptic Curve Cryptosystem process is described below.

The Elliptic Curve Cryptosystem processing circuit performs the Elliptic Curve Cryptosystem process. The Elliptic Curve Cryptosystem is one of public key cryptosystem algorithms using different keys for encryption and decryption, and uses 160-bit-length keys to exhibit performance equivalent to that the RSA cryptosystem using 1024-bit-length keys. In the encryption apparatus, the ECC processing circuit is formed by using the Montgomery's method. Specifically, as FIG. 6 shows, the ECC processing circuit includes 32-bit-width shift register groups 50 and 60 for retaining values for arithmetic operations which are supplied from a CPU (not shown), a shift register group 70 for capturing results, and an Elliptic Curve operation core circuit 80 including an adder, a subtractor, and a multiplier (not shown) which each have an input of a mainly 32-bit width. The Elliptic Curve Cryptosystem processing circuit includes bus-changeover switches MUX0, MUX1, and MUX2.

In the Elliptic Curve Cryptosystem processing circuit, a special technique called the Montgomery's Method is used to realize high speed processing and reduced circuit size. The Elliptic Curve operation core circuit 80 is mainly formed by a combination circuit of an adder, a subtractor, and a multiplier, and processes two 32-bit data items in each arithmetic operating step. Accordingly, in order to reduce circuit size, as described above, the adder in the Elliptic Curve operation core circuit 80 is also used as the adder in the SHA-1 processing circuit.

Also, in addition to the three sets of 32-bit-width shift registers 50, 60, and 70, the Elliptic Curve Cryptosystem processing circuit also includes bus-changeover switches MUX0, MUX1, and MUX2 which respectively correspond to the shift registers 50, 60, and 70, and which each can change bit width in order to process, for example, 160-bit width, 192-bit width, or 224-bit width. In other words, in order to cope with 160-bit width, 192-bit width, or 224-bit width, the three sets of 32-bit shift registers 50, 60, and 70 are provided in the Elliptic Curve Cryptosystem processing circuit so that the number of stages can be switched to five, six, or seven.

Figure 7A:
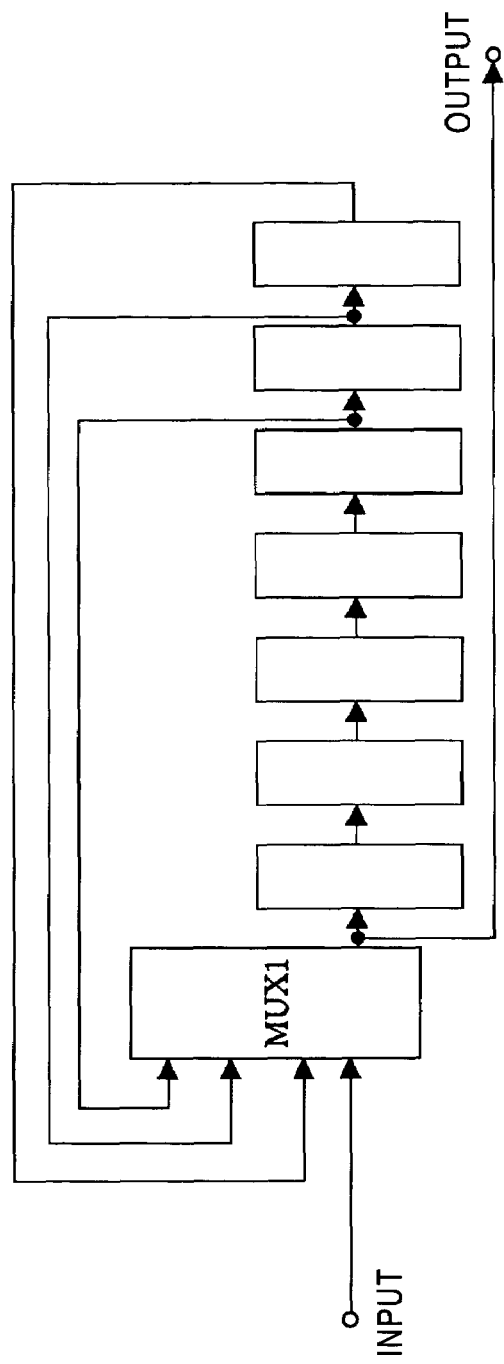
Figure 7B:
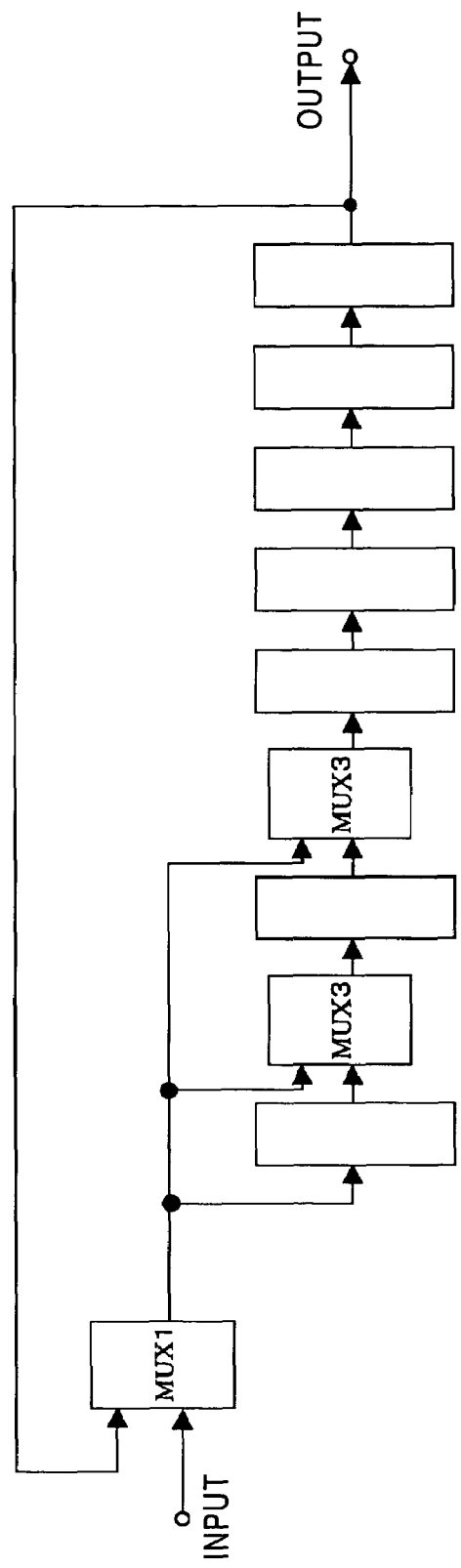

Regarding a specific example of the above, as FIG. 7a shows a main configuration in the vicinity of the shift register group 60 is shown in FIG. 7A, it is possible that the number of shift registers from the right in the shift register group 60 be changed so that, among an input, and outputs from the fifth-, sixth-, and seventh-stage shift registers, any one signal is used as an output from the bus-changeover switch MUX1. Regarding another specific example of the above, as FIG. 7B shows a main configuration in the vicinity of the shift register group 60, it is possible that the number of shift registers from the left in the shift register group 60 be changed in such a manner that a bus-changeover switch MUX1 in which, among an input and an output from the seventh-stage shift register, any one signal is used as an output, is provided, a bus-changeover switch MUX2 is provided in a stage after the first-stage shift register, and a bus-changeover switch MUX3 is provided in a stage after the second-stage shift register. In the Elliptic Curve Cryptosystem processing circuit, the shift register groups 50 and 70 can be similarly formed.

As described above, in the Elliptic Curve Cryptosystem processing circuit, the bus-changeover switches MUX0, MUX1, and MUX2 for each changing bit width are provided respectively correspondingly to the three sets of 32-bit-width shift register groups 50, 60, and 70. Accordingly, as described above, in order to reduce circuit size, in the encryption apparatus, the shift register groups 50, 60, and 70 in the Elliptic Curve Cryptosystem processing circuit are also used as the shift registers in the SHA-1 processing circuit, and the bus-changeover switches MUX0, MUX1, and MUX2 in the Elliptic Curve Cryptosystem processing circuit are also used as the bus-changeover switches in the SHA-1 processing circuit.

The above-described SHA-1 processing circuit can be used by using 32-bit-width shift register groups when the configuration in FIG. 3 is employed. In the SHA-1 processing circuit, the registers for retaining the hash values as final results and the values obtained in the middle of operations is interchangeable with the ALU RAM 40, as described with reference to FIG. 2. Therefore, in the encryption apparatus, an ALU RAM (not shown) for use in arithmetic processing in the Elliptic Curve Cryptosystem processing circuit is also used as the ALU RAM 40. This enables the encryption apparatus, not only to have reduced circuit size, but also to perform high speed processing since the time required for transferring data is eliminated by directly storing, in the ALU RAM, hash values for use in the next Elliptic Curve Cryptosystem processing.

Finally, the DES encryption processing circuit used as hardware for performing the DES encryption processing is described below.

The DES encryption processing circuit performs the DES encryption processing. The DES encryption processing is one of public key cryptosystem algorithms using a single communication key for encryption and decryption. In the encryption apparatus, the DES encryption processing circuit is formed so as to perform the so-called "triple DES encryption processing" that performs DES encryption processing triply.

Since the DES encryption processing circuit performs triple DES encryption processing, groups of shift registers for retaining key data are larger in size, compared with the case of performing ordinary single DES encryption processing. Thus, the DES encryption processing circuit requires groups of shift registers also when performing a so-called "cipher block chaining mode" which is a chaining technique used in the case of performing DES encryption processing on a bit string. Therefore, in the DES encryption processing circuit, when the above groups of shift registers are represented in terms of gates, they are larger than the so-called "S box", and causes, as a whole, an increase in circuit size.

The triple DES encryption processing is executed such that a DES operation core circuit is used to perform arithmetic processing three times, with key data changed to three types. Accordingly, when the DES encryption processing circuit is applied to a nonreciprocal circuit component of so-called "Type A", by using the shift register group 70 in the Elliptic Curve Cryptosystem processing circuit in FIG. 6, as a shift register group for retaining key data, only one bus-changeover switch having 64- or 32-bit-width may be provided. Since the Elliptic Curve Cryptosystem processing circuit also includes a bus-changeover switch, the DES encryption processing circuit does not need any additional circuit by using the bus-changeover switch. When the DES encryption processing circuit is applied to a noncontact IC card of so-called "Type B", by preparing three types of key data, and exchanging the three types of key data in a form shifted two registers whenever single DES encryption processing is performed, the noncontact IC card of Type B can be operated similarly to the case of the noncontact IC card of Type A. In addition, the DES encryption processing circuit uses the shift register groups of the Elliptic Curve Cryptosystem processing circuit as shift registers for retaining data and as shift registers for retaining results. Thus, a very small number of additional circuits enable triple DES encryption processing.

Figure 8:
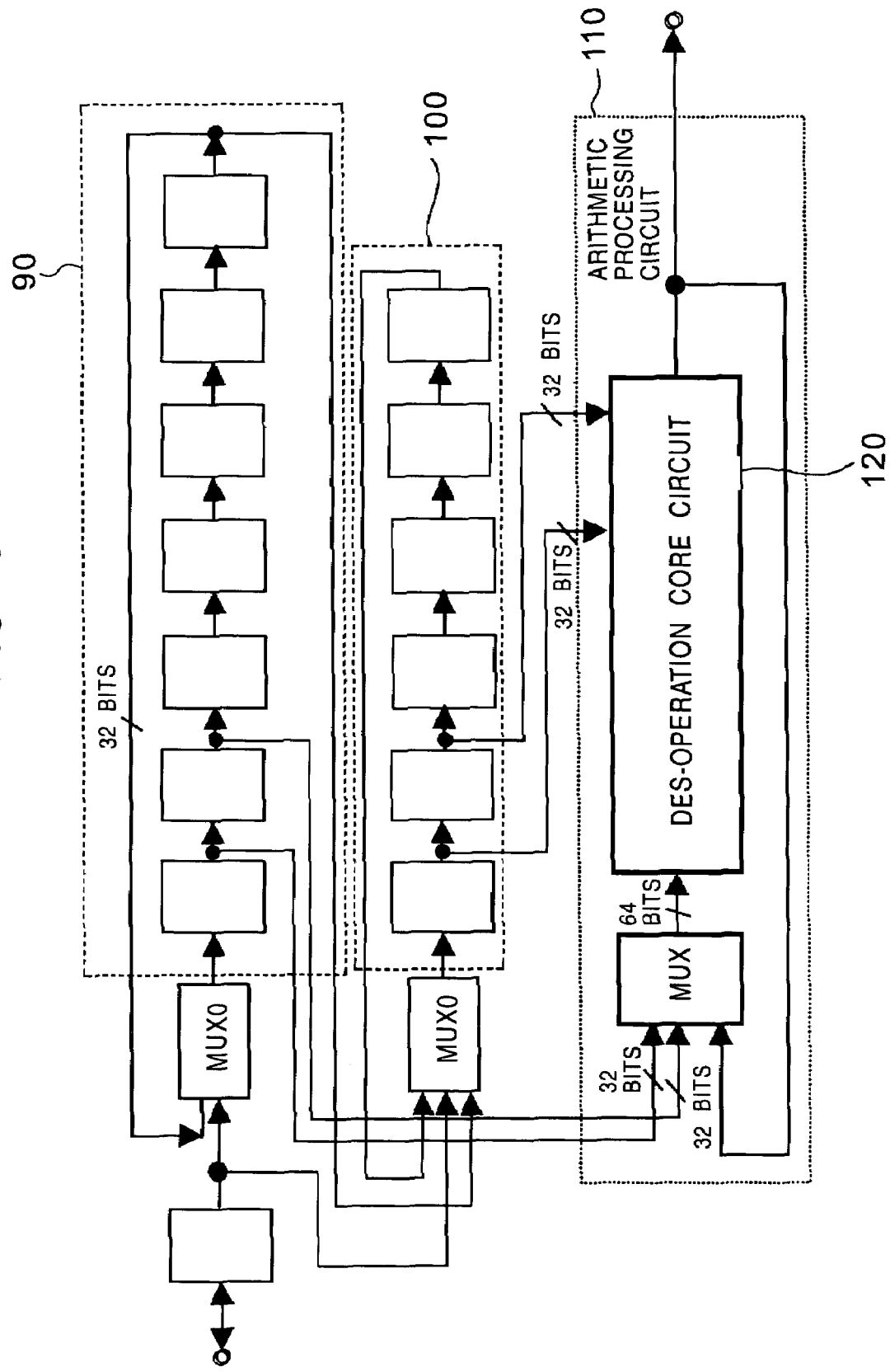
FIG. 8 is a block diagram illustrating a configuration as a specific example in which a DES encryption processing circuit is implemented.

The above-described DES encryption processing circuit can be specifically formed as shown in FIG. 8. The DES encryption processing circuit in FIG. 8 includes a 32-bit-width shift register group 90 for retaining data supplied from a CPU (not shown), a shift register group 100 for retaining key data, an arithmetic processing circuit 110 including a DES-operation core circuit 120, and bus-changeover switches MUX and MUX0.

Although the DES encryption processing circuit ordinarily needs 64-bit-width buffers, it only needs the 32-bit-width shift register groups 90 and 100. In the DES encryption processing circuit, for exchanging data for use in triple DES encryption processing, a cyclic form is used without using bus-changeover switches, whereby the need for bus-changeover switches is eliminated. As described above, in the DES encryption processing circuit, for the above-described Elliptic Curve Cryptosystem processing circuit, almost no additional circuits are required excluding the arithmetic processing circuit 110 including the DES operation core circuit 120. This enables greatly reduced circuit size.

The SHA-1 processing circuit, the Elliptic Curve Cryptosystem processing circuit, and the DES processing circuit, in which components can be easily shared, have been described. An encryption apparatus formed by integrating the SHA-1 processing circuit, the Elliptic Curve Cryptosystem processing circuit, and the DES processing circuit is described below.

A very large number of common components are found by comparing the SHA-1 processing circuit in FIG. 2 and the DES processing circuits in FIGS. 6 and 8. Therefore, the encryption apparatus can be formed as shown in FIG. 9.

Figure 9:
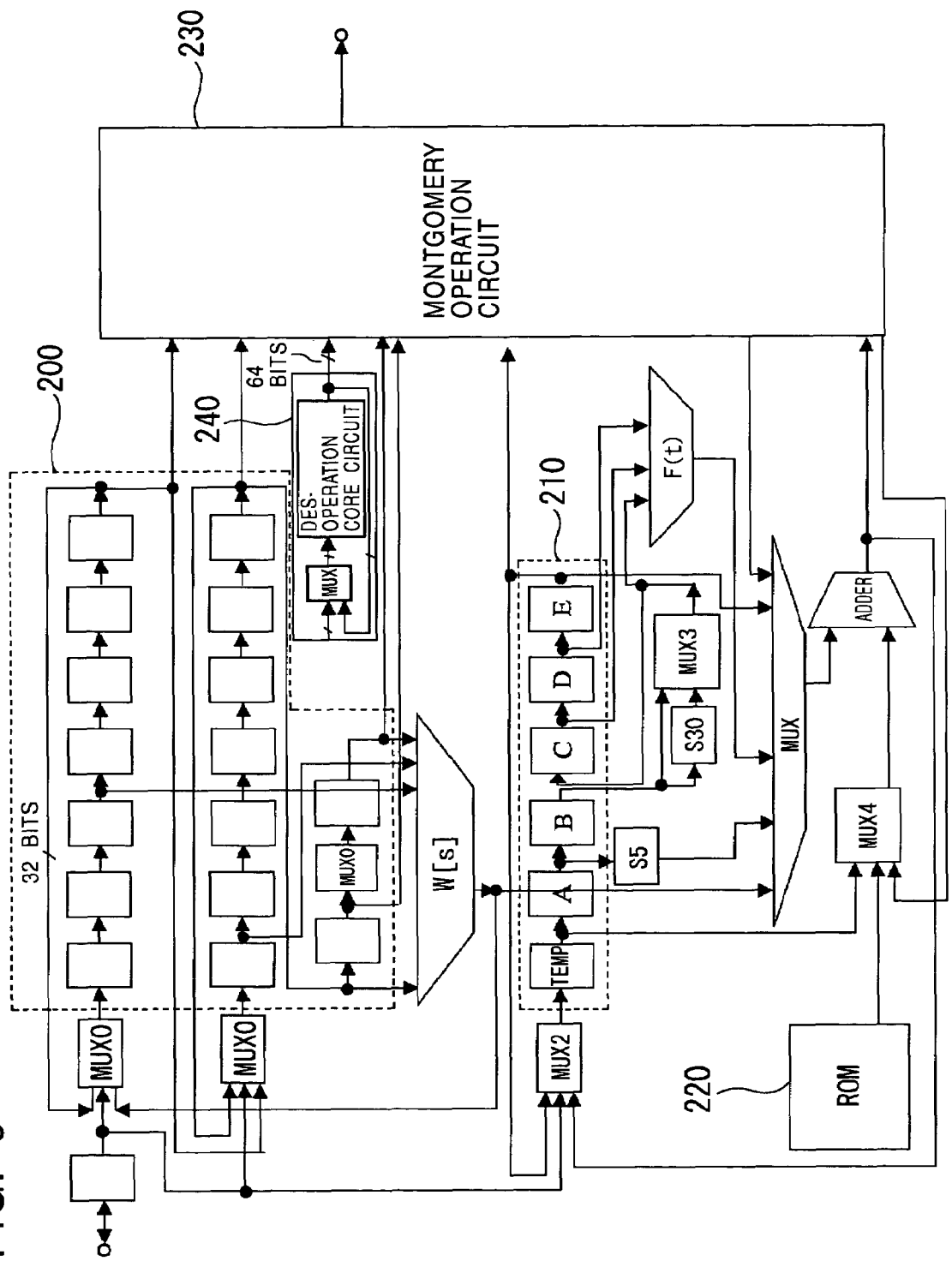
FIG. 9 is a block diagram illustrating a configuration as a specific example in which the encryption apparatus is implemented.

Specifically, as shown in FIG. 9, the encryption apparatus includes two shift register groups 200 and 210, a ROM 220 corresponding to the ROM 30 in the SHA-1 processing circuit in FIG. 2, a Montgomery operation circuit 230 that functions as the ALU RAM 40 in the SHA-1 processing circuit in FIG. 2 and as the elliptic-curve-operation core circuit 80 in the DES encryption processing circuit in FIG. 6, an arithmetic processing circuit 240 corresponding to the arithmetic processing circuit 110 in the DES processing circuit in FIG. 8, and the above various arithmetic processing circuits for performing various arithmetic operations in the SHA-1 processing. In FIG. 9, wirings between the shift register group 200 and the arithmetic processing circuit 240 are not shown.

More specifically, in the encryption apparatus, the shift register group 10 in the SHA-1 processing circuit in FIG. 2, the shift register groups 50 and 60 in the Elliptic Curve Cryptosystem processing circuit in FIG. 6, and the shift register groups 90 and 100 in the DES encryption processing circuit in FIG. 8 are used in common as the shift register group 200. Also, in the encryption apparatus, the shift register group 20 in the SHA-1 processing circuit in FIG. 2, the shift register group 70 in the Elliptic Curve Cryptosystem processing circuit in FIG. 6 are used in common as the shift register group 210.

In the encryption apparatus, by using the bus-changeover switch MUX to connect the Montgomery operation circuit 230 and the adder used in the SHA-1 processing, the adder required for the Elliptic Curve Cryptosystem processing is eliminated.

In the encryption apparatus, a bus-changeover switch is used in common as the bus-changeover switch MUX0 in the SHA-1 processing circuit in FIG. 2, the bus-changeover switch MUX0 in the Elliptic Curve Cryptosystem processing circuit in FIG. 6, or the bus-changeover switch MUX0 in the DES processing circuit in FIG. 8. In addition, a bus-changeover switch is used in common as the bus-changeover switch MUX1 in the Elliptic Curve Cryptosystem processing circuit in FIG. 6, or the bus-changeover switch MUX0 in the DES processing circuit in FIG. 8.

As described above, each component in the SHA-1 processing circuit, the Elliptic Curve Cryptosystem processing circuit, and the DES processing circuit can be mutually shared, and by switching hardware components operated in accordance with processing modes (described later), the circuit size can be reduced to approximately a half of the normally required number of gates. In the encryption apparatus, the reduced circuit size can also reduce power consumption to approximately a half.

In the encryption apparatus, a load on the CPU (not shown) for controlling the above components can also be reduced. For example, in the encryption apparatus, a position in which the hash value calculated by the SHA-1 process is stored in the ALU RAM is set beforehand as addresses for use in the Elliptic Curve Cryptosystem process, whereby, after the hash value is calculated by the SHA-1 process, the Elliptic Curve Cryptosystem process can be directly activated. Thus, most of consecutive operations such as signature creation and signature verification can be executed at high speed by hardware. Accordingly, in the encryption apparatus, the load on the CPU can be reduced, and endurance against an attack by falsification of software, etc., can be enhanced. Normally, in the encryption processing, when the CPU is entrusted with transmission and reception of arithmetic results in the middle of the processing, posing is easily permitted by falsifying software, while, in the encryption apparatus, falsification by intervention of the CPU in the middle of arithmetic processing can be avoided.

An application of a case to which the above-described encryption apparatus is applied is described below.

As described above, the encryption apparatus can be applied to the noncontact IC card.

Figure 10:
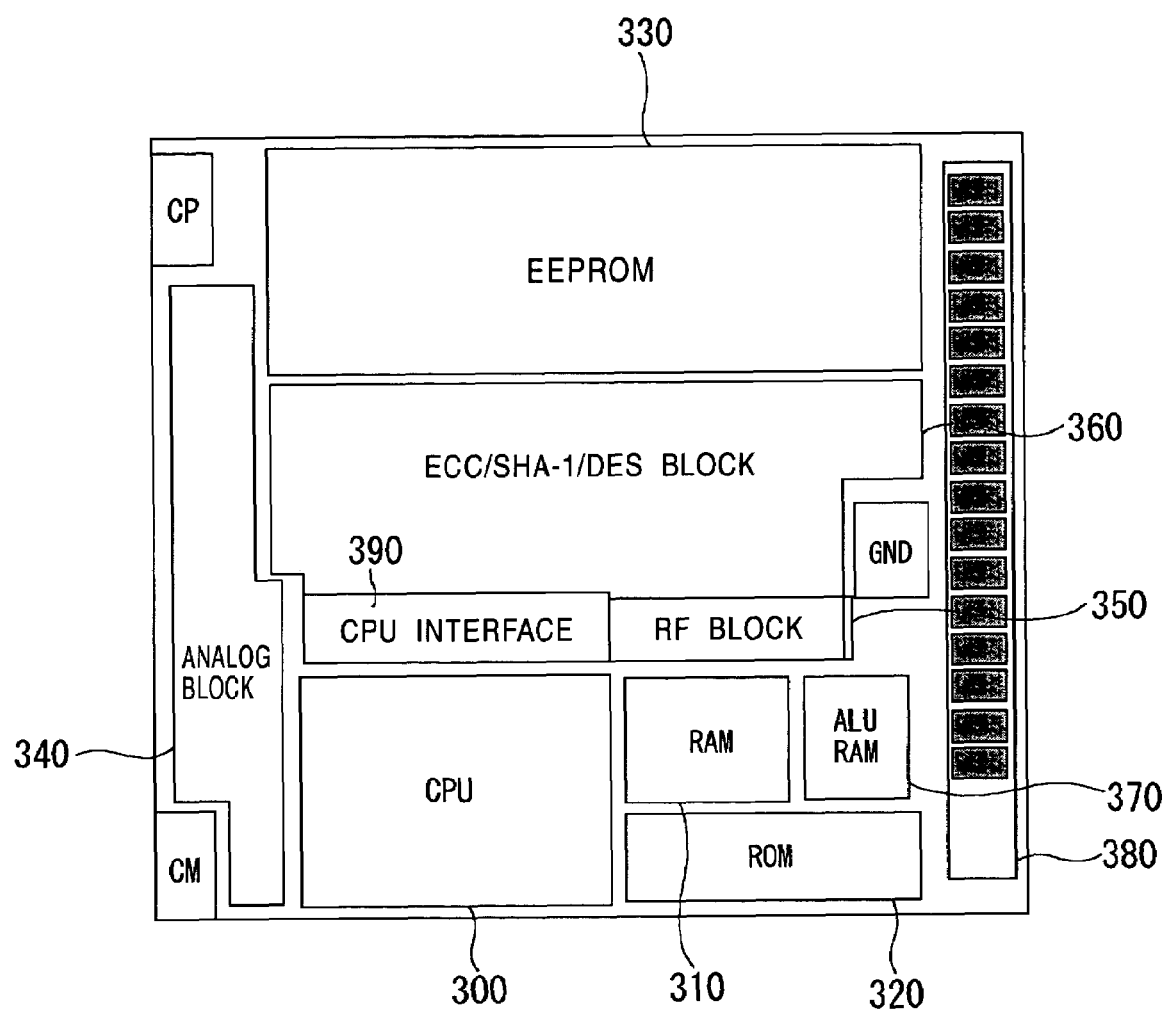
FIG. 10 is a block diagram illustrating a noncontact IC card to which the encryption apparatus is applied.

As FIG. 10 shows, the noncontact IC card has a large scale integration form integrating a CPU 300 for controlling components, a RAM 310 which is a memory functioning as a work area for the CPU 300 and which has a storage capacity of, for example, 2 KB, a ROM 320 which is a dedicated memory for storing various programs and which has a storage capacity of, for example, 32 KB, an electrically erasable programmable read only memory (EEPROM) 330 in which electric rewriting can be performed, and which has a storage capacity of, for example, 9 KB, an analog block 340 such as a power-supply circuit, a radio frequency block 350 for performing radio communication, an ECC/SHA1/DES block 360 corresponding to the encryption apparatus performing the Elliptic Curve Cryptosystem process, the SHA-1 process, and the triple DES encryption process, an ALU RAM 370 (as described above) having a storage capacity of, for example, 1 KB, a test block 380 having a land for a tester, a CPU interface 390 which is a bus for sending and receiving data between the CPU 300 and each component.

The above-described noncontact IC card is obtained such that the encryption apparatus in FIG. 9 is set as the ECC/SHA1/DES block 360. Under the control of the CPU 300, the noncontact IC card operates the ECC/SHA1/DES block 360 to perform the Elliptic Curve Cryptosystem process, the SHA-1 process, and the triple DES encryption process. At this time, as described above, in the noncontact IC card, hardware components are changed in a time-sharing manner in accordance with each processing mode.

For a specific description of the time-divisional operation, as FIG. 11 shows, the components are functionally represented. In FIG. 11, the analog block 340 is not shown, and for convenience of description, the ECC/SHA1/DES block 360 is represented in a form broadly divided into an ECC/SHA1/DES block $360_1$ indicating the functions of the Elliptic Curve Cryptosystem process and the SHA-1 process, and a DES block $306_2$ indicating the function of the triple DES encryption process.

Processing modes of the noncontact IC card are broadly divided into four modes: a communication mode that mainly performs communication; an Elliptic Curve Cryptosystem processing mode that performs the Elliptic Curve Cryptosystem process; a DES encryption processing mode that performs the triple DES encryption process; and an ALU RAM mode that accesses the ALU RAM 370.

Figure 12A:
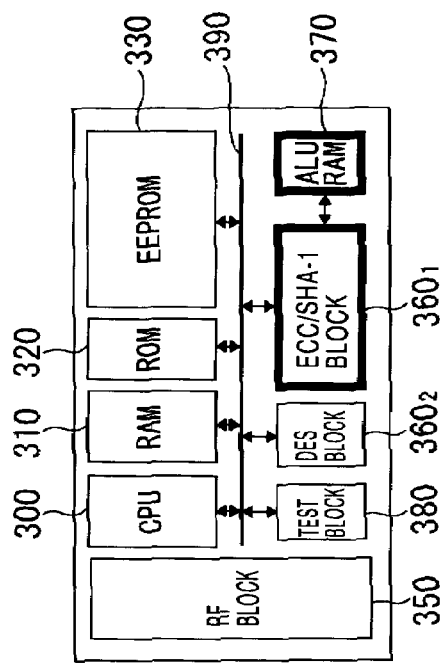

When the noncontact IC card is in the communication mode, as indicated by the bold line blocks shown in FIG. 12A, the CPU 300, the RAM 310, the ROM 320, the EEPROM 330, and the RF block 350 operate. Specifically, when the noncontact IC card is in the communication mode, under the control of the CPU 300, a predetermined communication program stored in the ROM 320 is started, various types of information stored in the RAM 320 and the EEPROM 330 are transmitted to the exterior through the RF block 350, and various types of information externally received through the RF block 350 are stored in the RAM 320 and the EEPROM 330.

Figure 12C:
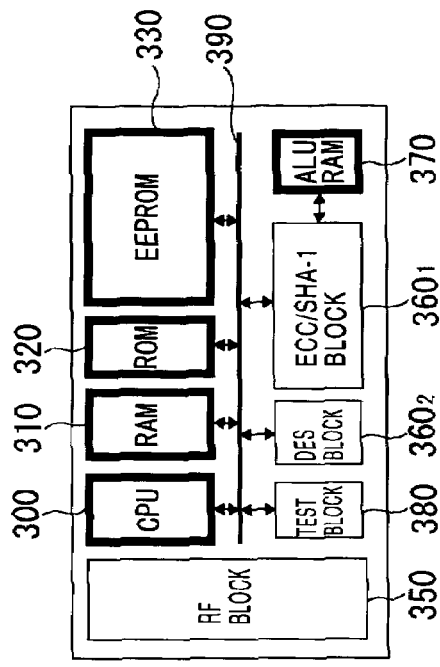
Figure 12B:
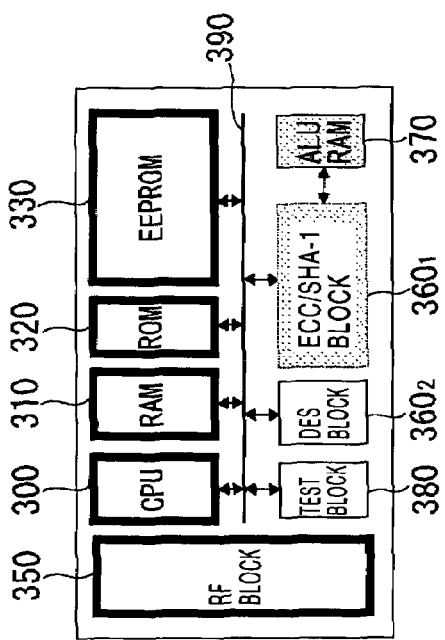

When the noncontact IC card is in the Elliptic Curve Cryptosystem processing mode, as indicated by the bold line blocks shown in FIG. 12B, an ECC/SHA1 block $360_1$ and an ALU RAM 370 operate.

Specifically, when the noncontact IC card is in the Elliptic Curve Cryptosystem processing mode, the ECC/SHA1 block $360_1$ performs the SHA-1 process, and an obtained hash value is stored in the ALU RAM 370, and the hash value is read from the ALU RAM 370 and is used to perform the Elliptic Curve Cryptosystem process by the ECC/SHA1 block $360_1$.

When the noncontact IC card is in the DES encryption processing mode, as indicated by the bold line blocks shown in FIG. 12C, a CPU 300, a RAM 310, a ROM 320, and a DES block $360_2$ operate. Specifically, when the noncontact IC card is in the DES encryption processing mode, a predetermined pseudo-random-number (hereinafter referred to also as "PN") series is read as a seed or key data, and the triple DES encryption process is performed, with the RAM 310 used as a work area.

Figure 12D:
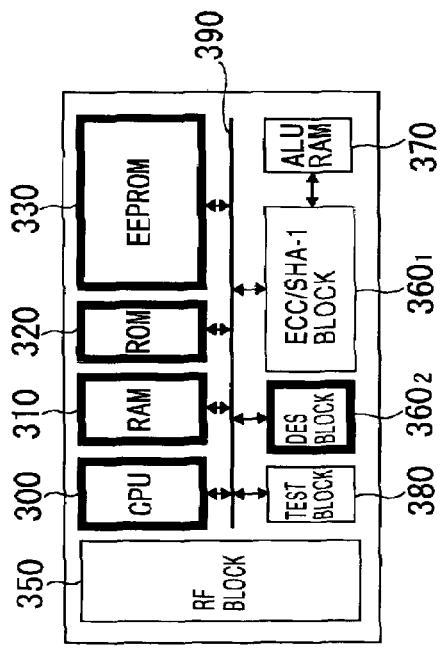

When the noncontact IC card is in the ALU RAM mode, as indicated by the bold line blocks shown in FIG. 12D, a CPU 300, a RAM 310, a ROM 320, and an ALU RAM 370 operate. Specifically, when the noncontact IC card is in the ALU RAM mode, under the control of the CPU 300, predetermined information of various types, stored in the ROM 320, is read and the ALU RAM 370 is accessed, with the RAM 310 used as a work area.

Accordingly, in the noncontact IC card, hardware components are changed in a time-sharing manner in accordance with each processing mode, whereby even a configuration sharing hardware can perform a plurality of processes that cannot be simultaneously performed. This enables reduced circuit size and reduced power consumption.

As described above, in the encryption apparatus as an embodiment of the present invention, each hardware component for performing various processes is shared by the processes, whereby high-speed and secure signature creation and verification using a public key can be performed with reduced circuit size and very small power consumption.

Therefore, when the encryption apparatus is implemented as a large scale integration or the like, the chip size can be greatly reduced. Thus, the encryption apparatus can be easily applied to the noncontact IC card, etc. In this case, even in a case in which the encryption apparatus is applied to a noncontact IC card, reduced power consumption realizes a practical communication distance of several centimeters. In addition, since the encryption apparatus has good endurance against an attack such as falsification, it is effective to apply the encryption apparatus to a service using the noncontact IC card, in which high security is required.

The present invention is not limited to the above embodiments. For example, in the above embodiments, the Elliptic Curve Cryptosystem is described as the public key cryptosystem. However, the present invention may be easily applied to other public key cryptosystems such as the RSA cryptosystem.

Although the above embodiments describe the use of the SHA-1 as a hash function, the present invention may be easily applied to other hash functions such as Message Digest 5 (MD5).

The above embodiments describe a technique in which random numbers for use in a key generating process necessary for performing encryption processing are generated by the DES cryptosystem which is one of public key cryptosystems. However, in the present invention, an arbitrary technique for generating random numbers may be used.

Although the above embodiments describe the noncontact IC card as an application of the encryption apparatus, it is obvious that the present invention may be applied to an arbitrary apparatus or device requiring similar functions.

Therefore, it is obvious that the present invention may be modified, as required, without departing the gist thereof.

What is claimed is:

1. An encryption apparatus for performing public-key-cryptosystem encryption processing, comprising:

public-key-cryptosystem processing means including a register group composed of registers for retaining values for use in arithmetic operations and registers for capturing the results of the arithmetic operations, said public-key-cryptosystem processing means performing public-key-cryptosystem encryption processing; and hash value generating means for generating a hash value for use in said public-key-cryptosystem processing means, wherein the register group is also used as at least a register group composed of registers for retaining values for arithmetic operations in said hash value generating means and registers for capturing a resultant hash value, and hardware components are changed in a time-sharing manner in accordance with a processing mode, wherein:

said public-key-cryptosystem-operation core means includes a bus-changeover switch for changing a bit width, and said hash value generating means includes a bus-changeover switch for changing a bit width which is also used as the bus-changeover switch of said public-key-cryptosystem processing means.

2. An encryption apparatus according to claim 1, further comprising common-key-cryptosystem encryption processing means for generating random numbers which are necessary when said public-key-cryptosystem processing means performs encryption processing, wherein the register group in said public-key-cryptosystem processing means is also used as a register group in said common-key-cryptosystem processing means which is composed of registers for retaining data and registers for retaining key data.

3. An encryption apparatus according to claim 2, wherein said common-key-cryptosystem encryption processing means performs Data Encryption Standard encryption processing.

4. An encryption apparatus according to claim 1, wherein:

said public-key-cryptosystem processing means includes public-key-cryptosystem-operation core means for performing various types of arithmetic operations in the public-key-cryptosystem encryption processing;

said hash value generating means includes hash-value-operation core means for various types of arithmetic operations in the hash value generation; and said public-key-cryptosystem-operation core means and said hash-value-operation core means share the same hardware components.

5. An encryption apparatus according to claim 4, wherein:

said public-key-cryptosystem-operation core means includes adding means, and said hash-value-operation core means includes adding means; and the adding means of said public-key-cryptosystem-operation core means and the adding means of the said hash-value-operation core means share the same hardware components.

6. An encryption apparatus according to claim 1 further comprising common-key-cryptosystem processing means which performs common-key-cryptosystem encryption processing for generating random numbers which are necessary for the encryption processing by the public-key-cryptosystem processing means, wherein said common-key-cryptosystem processing means includes a bus-changeover switch which is also used as the bus-changeover switch of said public-key-cryptosystem processing means.

7. An encryption apparatus according to claim 1, further comprising storage means for storing the hash value generated by said hash value generating means, wherein:

said hash value generating means stores the generated hash value at an address used by said public-key-cryptosystem processing means when storing the generated hash value in said storage means; and said public-key-cryptosystem processing means reads the stored hash value from said storage means.

8. An encryption apparatus according to claim 1, wherein said public-key-cryptosystem processing means performs Elliptic Curve Cryptosystem processing.

9. An encryption apparatus according to claim 1, wherein said hash value generating means performs Secure Hash Algorithm 1 processing.

10. A noncontact integrated circuit card having a communication function, comprising an encryption apparatus according to claim 1 which is built into said noncontact integrated circuit card.

11. A noncontact integrated circuit card having a communication function, comprising:

an encryption apparatus including, public-key-cryptosystem processing means including a register group composed of registers for retaining values for use in arithmetic operations and registers for capturing the results of the arithmetic operations, said public-key-cryptosystem processing means performing public-key-cryptosystem encryption processing; and hash value generating means for generating a hash value for use in said public-key-cryptosystem processing means, wherein the register group is also used as at least a register group composed of registers for retaining values for arithmetic operations in said hash value generating means and registers for capturing a resultant hash value, and hardware components are changed in a time-sharing manner in accordance with a processing mode, and said encryption apparatus is built into said noncontact integrated circuit card.

* * * * *